United States Patent [19]

Mori et al.

[11] Patent Number: 5,396,373
[45] Date of Patent: Mar. 7, 1995

[54] MAGNETIC RECORDING/REPRODUCING APPARATUS USING SEGMENT RECORDING SYSTEM

[75] Inventors: Kouji Mori, Chiba; Satoshi Murakami, Noda; Ichirou Konno, Matsudo, all of Japan

[73] Assignee: Sharp Kabushiki Kaisha, Osaka, Japan

[21] Appl. No.: 26,850

[22] Filed: Mar. 5, 1993

[30] Foreign Application Priority Data

Mar. 10, 1992 [JP] Japan .................................. 4-051006

[51] Int. Cl.$^6$ ............................................. G11B 5/02
[52] U.S. Cl. ........................................ 360/22; 360/18; 360/73.04; 358/338
[58] Field of Search ............ 360/70, 22, 71, 36.1, 360/72.1, 72.2, 73.01, 73.04, 73.05, 73.07, 73.08, 73.09, 73.12, 10.3, 18, 27; 358/335, 338

[56] References Cited

U.S. PATENT DOCUMENTS

| | | | |
|---|---|---|---|
| 4,885,647 | 12/1989 | Sugiki et al. | 360/73.04 X |
| 4,887,169 | 12/1989 | Bannai et al. | 360/22 X |
| 5,008,763 | 4/1991 | Horino | 360/7 |
| 5,057,949 | 10/1991 | Suga et al. | 360/70 |
| 5,081,550 | 1/1992 | Yagisawa et al. | 360/78.02 |
| 5,267,093 | 11/1993 | Reime | 360/22 |

FOREIGN PATENT DOCUMENTS

| | | |
|---|---|---|
| 0276990 | 8/1988 | European Pat. Off. |
| 0368511 | 5/1990 | European Pat. Off. |
| 0431897 | 6/1991 | European Pat. Off. |
| 2-24813 | 1/1990 | Japan. |

OTHER PUBLICATIONS

Auto-Tracking System for UNIHI-VTR, Ryuuta Kawanaka et al Video Technology Development Center, NEC Corporation 1991.

*Primary Examiner*—Andrew L. Sniezek

[57] ABSTRACT

A digital VTR using Automatic Track Finding (ATF) of a four frequency pilot signal system, employing a multiple segment recording system for high density recording and wide band recording. In a recording mode, a segment code signal is recorded on each track in response to a frame synchronizing signal. In a reproduction mode, the phase difference between the reproduced segment code signal and the frame synchronizing signal is detected by phase comparing circuit 26. The rotation speed of capstan motor 29 is controlled so that the phase relation of one signal in the reproduction mode becomes the same as that in the recording mode. As a result, it is possible to reproduce a stable video in the VTR using the segment recording system.

11 Claims, 10 Drawing Sheets

FIG. 1 RECORDING SYSTEM CIRCUIT FOR DIGITAL VTR

RECORDING SYSTEM CIRCUIT FOR AN ANALOG VTR

FIG. 10 REPRODUCING SYSTEM CIRCUIT FOR AN ANALOG VTR

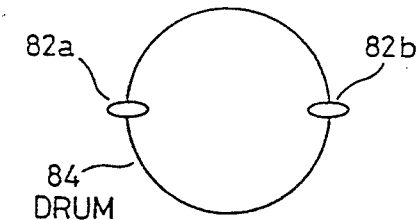
FIG. 16 PRIOR ART
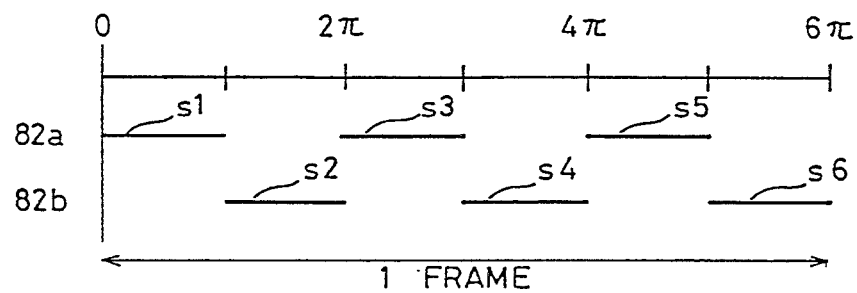
FIG. 17 PRIOR ART
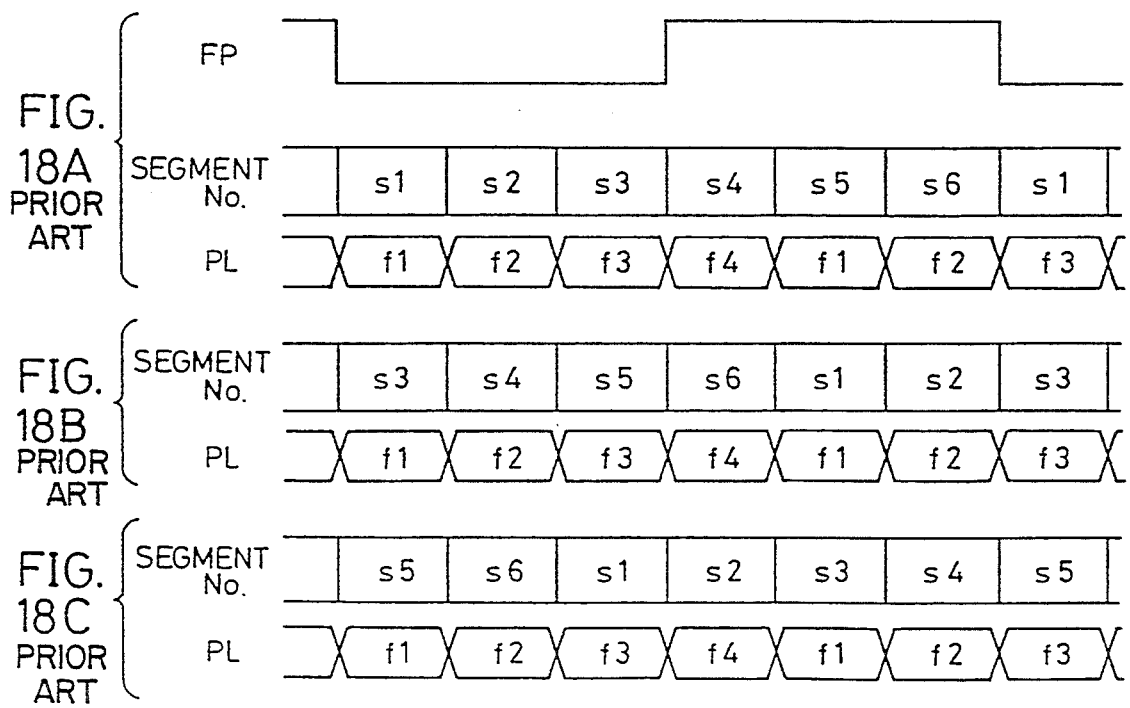

MAGNETIC RECORDING/REPRODUCING APPARATUS USING SEGMENT RECORDING SYSTEM

BACKGROUND OF THE INVENTION

1. Field of the Invention

The present invention relates generally to magnetic recording/reproducing apparatuses, and more particularly, to a magnetic recording/reproducing apparatus using a segment recording system. The present invention has particular applicability to digital and analog video tape recorders (VTRs).

2. Description of the Background Art

A conventional magnetic recording/reproducing apparatus using a magnetic tape such as a video tape recorder (hereinafter referred to as "VTR") as a recording medium records recording signals using a magnetic head on a number of video tracks formed obliquely on the magnetic tape. In reproduction, a magnetic head traces precisely on the recorded video tracks to reproduce the recorded signals. In order to make the video tracks be traced precisely, there is a conventional tracking system known as, Automatic Track Finding (hereinafter referred to as "ATF") having a four frequency pilot signal system.

The four frequency pilot signal system ATF is used in, for example, a stationary VTR or an 8 mm VTR including a camera, or a camcorder. In the four frequency pilot signal system ATF, four pilot signals f1 to f4 each having a different frequency are superimposed on a video signal, and the resultant signal is recorded on the magnetic tape. More specifically, since pilot signals (each having a different frequency) are recorded between adjoining two video tracks, crosstalk of pilot signals reproduced from two adjoining tracks in the reproduction operation is detected, and tracking control for tracing the magnetic head precisely is carried out in response to the level of the two reproduced pilot signals.

FIG. 13 is a schematic diagram showing an arrangement of four magnetic heads on a drum in a mechanism used in a conventional 8 mm camcorder or a VHS camcorder. Referring to FIG. 13, four magnetic heads 80a, 80b, 81a and 81b are provided on a drum 83 for recording and reproducing.

FIG. 14 is a signal recording chart for explaining a recording operation in the ATF system using a four frequency pilot signal. Referring to FIG. 14, the abscissa shows a rotation angle (radian) of drum 83 shown in FIG. 13. Signal recording with magnetic head 81a is carried out at a rotation angle in the range of 0 to $3/2\pi$. Signal recording with magnetic head 80b is carried out at a rotation angle in the range of $3/2\pi$ to $3\pi$. Signal recording with magnetic head 81b is carried out at a rotation angle in the range of $3\pi$ to $9/2\pi$. Signal recording with magnetic head 80a is carried out at a rotation angle in the range of $9/2\pi$ to $6\pi$.

As is seen from FIG. 14, when drum 83 rotates by $3/2\pi$ radian, a television signal of one field is recorded on one track on the magnetic tape by each magnetic head. More specifically, respective segment signals s1 and s2 shown in FIG. 14 are recorded on four tracks on the magnetic tape. Two fields are constituted of two segment signals s1 and s2, thereby constituting a television signal of one frame. Drum 83 (shown in FIG. 13) rotates at, for example, 2700 rpm, and the magnetic heads are switched every $3/2\pi$.

FIG. 15 is a timing chart for explaining a recording operation of an ATF system VTR using the four frequency pilot signal. Referring to FIG. 15, during a half period of a frame synchronizing signal FP, that is, one field period, one segment of the television signal is recorded. More specifically, each of segment signals s1 and s2 shown in FIG. 14 is recorded on a corresponding single track in the corresponding half period of the frame synchronizing signal FP.

In the ATF system using the four frequency pilot signal, pilot signals having different frequencies are recorded on respective tracks as described above. Therefore, in the example shown in FIG. 15, respective ones of the pilot signals f1 to f4 are recorded sequentially on respective segments. As is seen from FIG. 15, four frequency pilot signals f1 to f4 rotate in the order of f1 to f4, and are recorded sequentially in respective segments.

In the signal recording shown in FIG. 14, since a television signal of one field is recorded on one track, the signal recording system is referred to as "non-segment recording system." Conversely, "segment recording system" is known as a signal recording system in which a television signal of one field is divided into a plurality of segments, and the plurality of the segment signals are recorded on a plurality of tracks.

In order to improve video picture quality, high density recording and wide band recording of television signals have recently been developed. In order to implement high density recording and wide band recording, it is necessary to further increase the relative speed between the magnetic tape and the magnetic head. Therefore, the revolutions per minute rotation of a drum having a magnetic head is increased, and the aforementioned segment recording system is required.

The above-described ATF system using the four frequency pilot signal is used in the non-segment recording system, while a Control Track (hereinafter referred to as "CTL") system used in UNIHI-VTR and the like is heretofore used as a tracking control system in the segment recording system. In the UNIHI-VTR, the television signal constituting one frame is divided into six segments, and the six segment signals are recorded on six tracks. Since a control signal (CTL signal) generated for every one frame period is recorded on a control track on the magnetic tape in the CTL system, it is possible to easily match the phase of the six segment signals with the phase of the frame synchronizing signal in reproduction.

Since the CTL system needs a region dedicated to recording of a control signal, that is, a control track, in the magnetic tape, the ATF system requiring no dedicated region is preferable for high density recording. In other words, in order to implement high density recording and wide band recording, the ATF system is more suitable in which a video signal having a pilot signal superimposed thereon is recorded. However, segment recording in a VTR employing the ATF system causes the following problem.

FIG. 16 is a schematic diagram showing an arrangement of two magnetic heads on a drum in a VTR showing the background art of the present invention. Referring to FIG. 16, two magnetic heads 82a and 82b are provided on drum 84. For the purpose of high density recording and wide band recording, drum 84 rotates at a speed of 5400 rpm. Therefore, a television signal of one field is divided into three segments, resulting in division of the television signal of one frame into six segments. In other words, the television signal constituting one frame is recorded on six tracks on the magnetic tape.

FIG. 17 is a signal recording chart for explaining a recording operation in a VTR using magnetic heads 82a and 82b shown in FIG. 16. Referring to FIG. 17, the abscissa shows a rotation angle (radian) of drum 84. Signal recording using magnetic head 82a is carried out at a rotation angle in the range of 0 to $\pi$ (segment s1): magnetic head 82b, in the range of $\pi$ to $2\pi$ (segment s2): magnetic head 82a, in the range of $2\pi$ to $3\pi$ (segment s3):

magnetic head 82b, in the range of $3\pi$ to $4\pi$ (segment s4):

magnetic head 82a, in the range of $4\pi$ to $5\pi$ (segment s5):

magnetic head 82b, in the range of $5\pi$ to $6\pi$ (segment s6).

These segments s1 to s6 of the television signal are recorded on the six tracks on the magnetic tape, respectively.

FIGS. 18A to 18C are timing charts for explaining recording and reproducing operations in a VTR using magnetic heads 82a and 82b shown in FIG. 16. Referring to FIG. 18A, in a half period of the frame synchronizing signal FP, three segments of the television signal are recorded on three tracks on the magnetic tape. More specifically, in the example shown in FIG. 18A, three segments s1 to s3 of the television signal are recorded on three tracks in the former half period of the frame synchronizing signal FP, while three segments s4 to s6 of the television signal are recorded on the other three tracks in the latter half period. In the ATF system using the four frequency pilot signal, four pilot signals f1 to f4 having different frequencies from each other, corresponding to respective segments, are superimposed on a video signal, and the superimposed signals are recorded on corresponding tracks. Therefore, in the example shown in FIG. 18A, corresponding pilot signals f1, f2, . . . are recorded in respective segments s1, s2, . . . in the recording operation.

When the signal recording is carried out in the manner shown in FIG. 18A, the reproducing operation must be carried out in the same manner. More specifically, in the example shown in FIG. 18A, when the frame synchronizing signal FP falls, the segment s1 of the recorded television signal needs to be reproduced. In other words, the frame synchronizing signal FP must be in synchronization with the segment s1 of the reproduced television signal. If the first segment s1 of the reproduced television signal is not synchronized with the fall of the frame synchronizing signal FP, a desired video cannot be reproduced. Therefore, the reproducing operation needs to be controlled in the manner shown in FIG. 18A, that is, the manner in which the segment s1 of the reproduced television signal and the fall of the frame synchronizing signal FP are matched.

As shown in FIGS. 18B and 18C, however, when the frame synchronizing signal FP falls, it may happen that the segment s1 of the reproduced television signal cannot be obtained. In such a case, a desired video cannot be reproduced, and a measure is required.

A simple measure in such a case is to determine a segment number from the reproduced pilot signal frequency to synchronize the segment s1 with the frame synchronizing signal by using a pilot signal having six frequencies corresponding to six segments. However, in order to generate and determine a pilot signal having six frequencies, the circuit configuration becomes much more complicated compared to the four frequency pilot signal system. Furthermore, increase in the number of segments means the further complicated circuit configuration.

SUMMARY OF THE INVENTION

One object of the present invention is to reproduce a desired video in a magnetic recording/reproducing apparatus using a segment recording system, under a high density recording requirement.

Another object of the present invention is to reproduce a desired video in a magnetic recording/reproducing apparatus using a segment recording system under a wide band recording requirement.

The magnetic recording/reproducing apparatus according to the present invention divides a television signal of one field into a plurality of segments to record the same on a plurality of tracks on a magnetic tape. In one aspect, the magnetic recording/reproducing apparatus includes a magnetic head, a tape driving circuit for driving the magnetic tape, a synchronizing signal generating circuit for generating a predetermined synchronizing signal, a segment code generating circuit for generating a plurality of segment code signals indicating the plurality of segments in response to the synchronizing signal, a recording circuit for recording the plurality of segment code signals on the plurality of tracks on the magnetic tape through the magnetic head in synchronism with the synchronizing signal, a reproducing circuit for reproducing the plurality of segment code signals from the plurality of tracks on the magnetic tape through the magnetic head, and a control circuit for controlling the tape driving circuit so that the plurality of segment code signals reproduced by the reproducing circuit are synchronized with the predetermined synchronizing signal.

In operation, the recording circuit records the plurality of segment code signals on the plurality of tracks on the magnetic tape through the magnetic head in response to the synchronizing signal. In the reproduction mode, the reproducing circuit reproduces the plurality of segment code signals from the plurality of tracks on the magnetic tape through the magnetic head. Since the control circuit controls the tape driving circuit so that the reproduced plurality of segment code signals are synchronized with the predetermined synchronizing signal, it is possible to reproduce a segment of a recorded television signal in a synchronous manner in the recording mode. As a result, a desired video can be reproduced under requirements of high density recording and wide band recording.

According to another aspect of the present invention, the magnetic recording/reproducing apparatus includes a magnetic head, a tape driving circuit for driving a magnetic tape, a synchronizing signal generating circuit for generating a predetermined synchronizing signal, a start flag generating circuit for generating a start flag signal indicating start of a plurality of segments in response to the synchronizing signal, a recording circuit for recording the start flag signal on the first one of a predetermined number of tracks on the magnetic tape in synchronism with a predetermined edge of the synchronizing signal, a reproducing circuit for reproducing the recorded start flag signal from the track on the magnetic tape, and a control circuit for controlling the tape driving circuit so that the reproduced start flag signal is synchronized with a predetermined edge of the predetermined synchronizing signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a schematic diagram showing arrangement of two magnetic heads on a drum in a VTR showing the background of the present invention.

FIG. 17 is a signal recording chart for explaining the recording operation in the VTR using the magnetic heads shown in FIG. 16.

FIG. 18A is a timing chart showing a normal phase relation in the VTR using the magnetic heads shown in FIG. 16.

FIGS. 18B and 18C are timing charts for explaining an abnormal phase relation in the VTR using the magnetic heads shown in FIG. 16.

DESCRIPTION OF THE PREFERRED EMBODIMENTS

Figure 1:
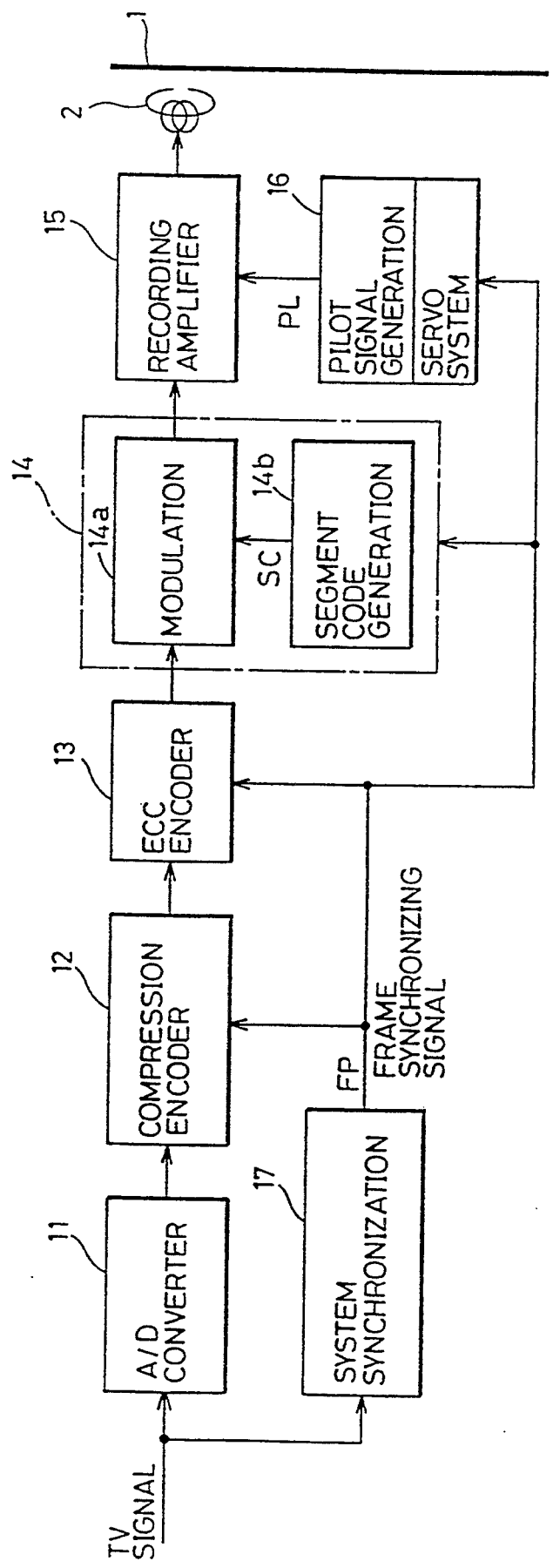
FIG. 1 is a circuit block diagram of a recording system of a digital VTR showing a first embodiment of the present invention.

FIG. 1 is a circuit block diagram of a recording system of a digital VTR showing the first embodiment of the present invention. Referring to FIG. 1, the recording system circuit includes an A/D converter 11 for converting an analog television signal to a digital signal, a compression encoder 12 for compressing data, an ECC encoder 13 for checking and correcting an error (hereinafter referred to as "ECC"), a modulation processing circuit 14 for recording data, a recording amplifier 15 for amplifying a recording signal, a pilot signal generating circuit 16 for generating a pilot signal for ATF, and a system synchronizing circuit 17 for generating a frame synchronizing signal FP in response to a television signal.

The frame synchronizing signal FP is applied to compression encoder 12, ECC encoder 13, modulation processing circuit 14, and pilot signal generating circuit 16. Modulation processing circuit 14 includes a segment code generating circuit 14b for generating a segment code, and a modulating circuit 14a for modulating video data and the segment code for recording. Magnetic head 2 is driven by a recording signal amplified by recording amplifier 15 to record the recording signal on a track on magnetic tape 1.

Figure 2:
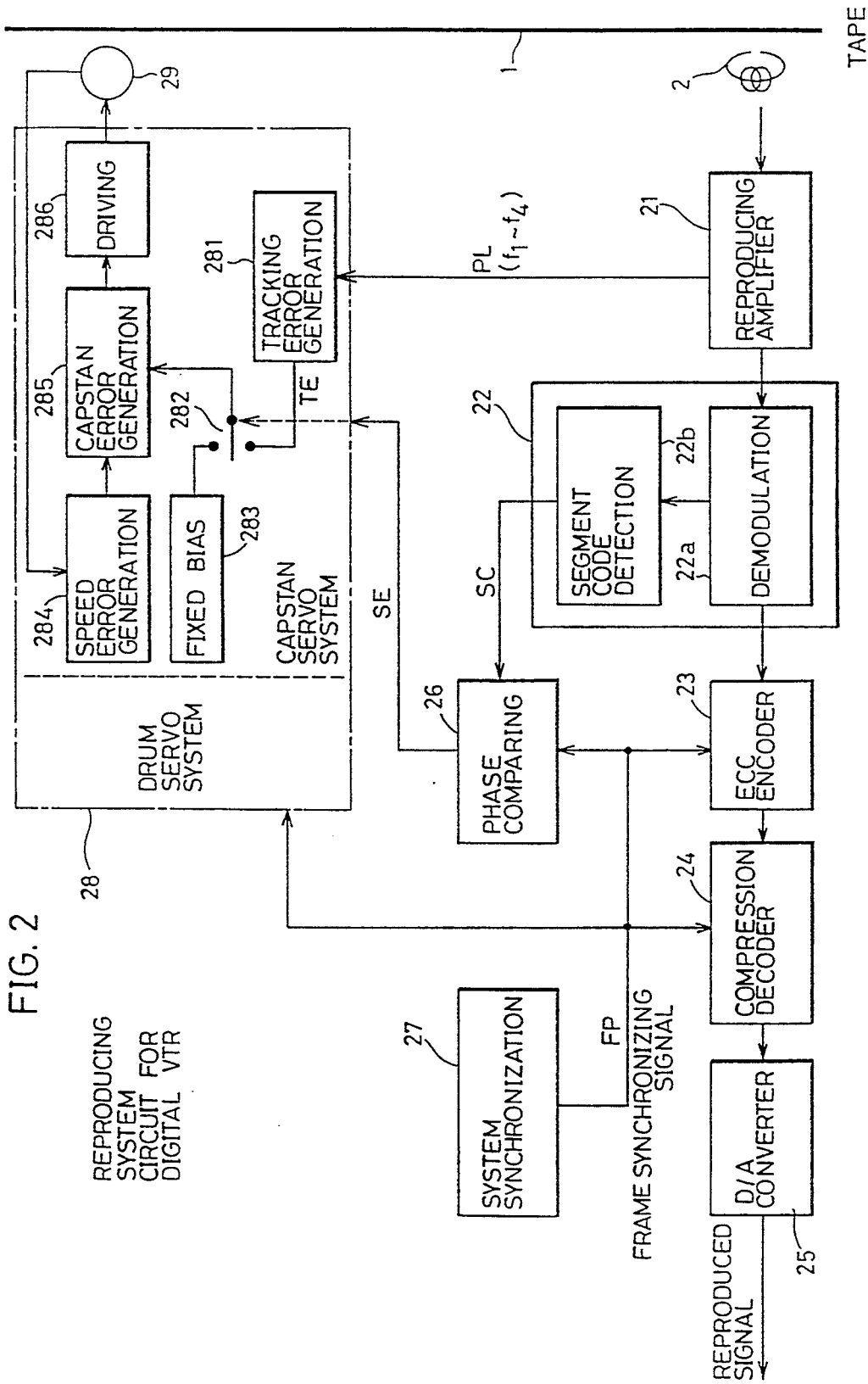
FIG. 2 is a circuit block diagram of a reproducing system in the first embodiment.

FIG. 2 is a circuit block diagram of a reproducing system in the embodiment shown in FIG. 1. Referring to FIG. 2, the reproducing system circuit includes a reproducing amplifier 21 for amplifying a signal reproduced from magnetic tape 1 through magnetic head 2, a demodulation processing circuit 22 for carrying out demodulation processing for the reproduced signal, an ECC decoder 23 for carrying out ECC processing for a demodulated signal, a compression decoder 24 for decompressing data, a D/A converter 25 for converting a digital signal to an analog signal, a phase comparing circuit 26 for generating a segment error signal SE from the frame synchronizing signal FP and a segment code signal SC, a system synchronizing circuit 27 for generating the frame synchronizing signal FP, and a servo system control circuit 28 for controlling the servo system including a capstan motor 29.

Servo system control circuit 28 includes a capstan servo system circuit and a drum servo system circuit. The capstan servo system circuit includes a tracking error generating circuit 281 for providing a tracking error signal TE in response to a detected pilot signal PL, a fixed bias circuit 283 for generating a fixed bias voltage for adjusting a segment phase, and a switching circuit 282 controlled in response to the segment error signal SE. A feedback loop constituting the capstan servo system is made up of a speed error generating circuit 284, a capstan error generating circuit 285, and a motor driving circuit 286.

Figure 3:
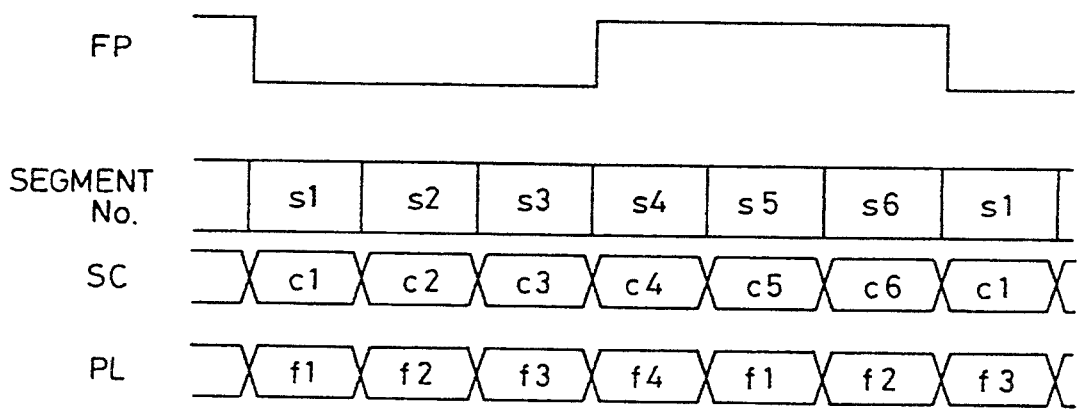
FIG. 3 is a timing chart for explaining the phase relation in a recording operation and a normal reproducing operation of the first embodiment.
Figure 4:
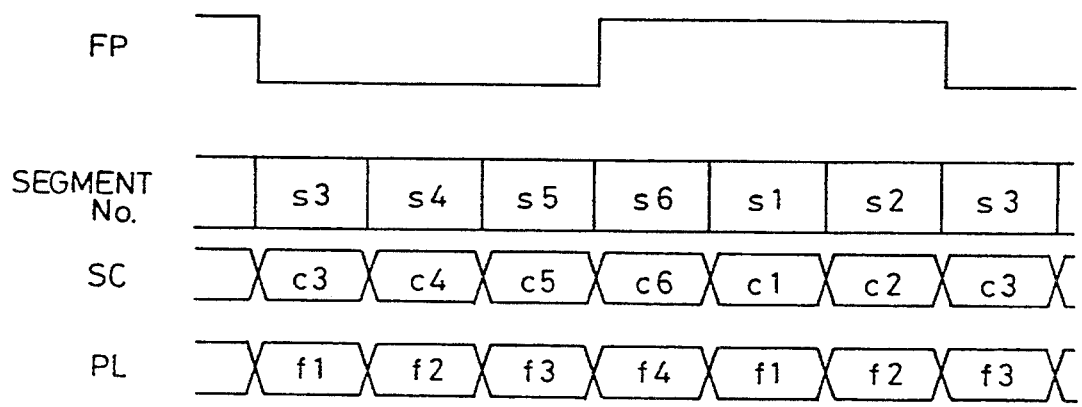
FIG. 4 is a timing chart for explaining an abnormal phase relation in the reproducing operation of the first embodiment.

Description will be first given to a schematic synchronizing operation between a segment of a reproduced television signal and the frame synchronizing signal FP in the digital VTR shown in FIGS. 1 and 2, with reference to FIGS. 3 and 4. Segment code generating circuit 14b shown in FIG. 1 generates the segment code signal SC in the manner shown in FIG. 3 in response to the frame synchronizing signal FP. More specifically, in the example shown in FIG. 3, in the recording mode, the segment code signal SC (c1, c2, . . . ) started in response to fall Of the frame synchronizing signal FP is generated from segment code generating circuit 14b. The segment code signal SC is modulated by modulating circuit 14a for recording with video data applied from ECC encoder 13, and the modulated signal is applied to recording amplifier 15.

On the other hand, pilot signal generating circuit 16 also generates four pilot signals PL (f1, f2, f3, and f4)

each having a different frequency in response to the frame synchronizing signal FP. The pilot signal PL is applied to recording amplifier 15.

In recording amplifier 15, the pilot signal PL is superimposed on a video signal applied from modulation processing circuit 14. The superimposed signal is amplified, and the amplified signal is applied to magnetic head 2. Therefore, recording signals recorded on magnetic tape 1 are recorded on respective recording tracks on magnetic tape 1 in a signal phase manner shown in FIG. 3.

In the reproduction mode, a signal reproduced through magnetic head 2 shown in FIG. 2 is amplified by reproducing amplifier 21. The reproduction pilot signal PL included in the amplified signal is applied to servo system control circuit 28. The reproducing signal including the segment code signal is applied to demodulating circuit 22a to cause demodulation processing to be carried out. The segment code signal included in the reproducing signal is detected by a segment code detecting circuit 22b, and the detected segment code signal SC is applied to phase comparing circuit 26.

Phase comparing circuit 26 compares a fall timing of the frame synchronizing signal FP applied from system synchronizing circuit 27 with a timing at which code c1 included in the segment code signal SC appears. When these two timings do not match with each other, that is, when a phase error is generated, a segment error signal SE for correcting the phase error is applied to servo system control circuit 28. Servo system control circuit 28 controls the rotation speed of capstan motor 29 so that the phase error should be corrected in response to the segment error signal SE.

For example, when the frame synchronizing signal FP is not synchronized with the segment code signal SC as shown in FIG. 4, the segment error signal SE for correcting the state is applied to servo system control circuit 28. The rotation speed of capstan motor 29 is changed under the control of servo system control circuit 28. Finally, the rotation speed of capstan motor 29 is controlled so that the segment code signal SC is reproduced in the signal manner shown in FIG. 3 also in the reproduction mode. These operations are shown more specifically in a flow chart shown in FIG. 5.

Figure 5:
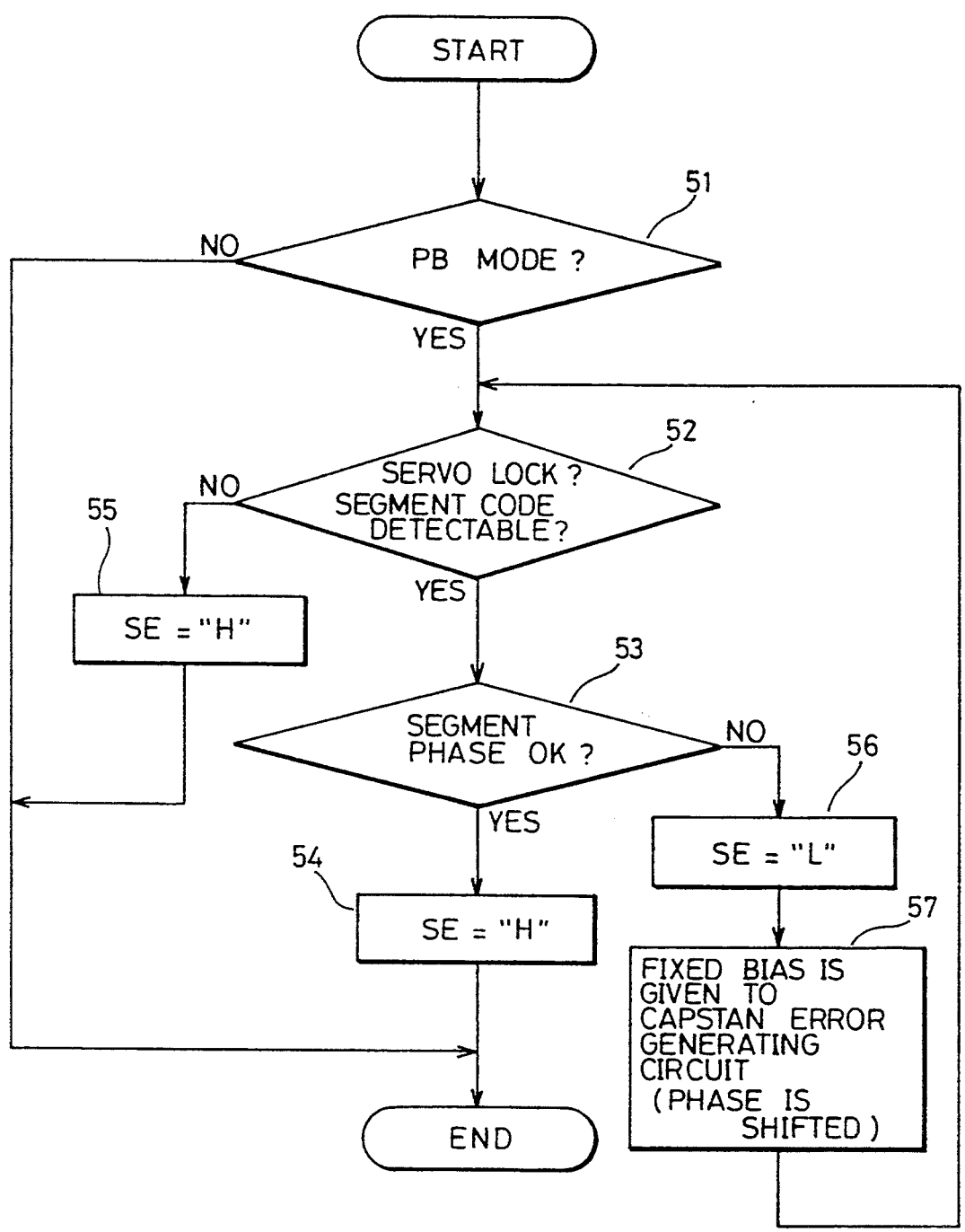
FIG. 5 is a flow chart for explaining operations of the reproducing system circuit shown in FIG. 2.

Referring to FIG. 5, in step 51, an operation in the VTR of the servo system in the reproduction mode (PB mode) is detected. When the operation of the servo system in the reproduction mode is detected, the process goes to step 52.

In step 52, the servo lock state of the capstan servo system is detected. Detection of the servo lock state is recognized by detecting output of the tracking error signal TE indicating "zero error" from tacking error generating circuit 281 show in FIG. 2. The capstan servo system in the servo lock state means that the segment code in the reproduced signal can be detected in segment code detecting circuit 22b shown in FIG. 2. When the segment code can be detected, the process goes to step 53.

In step 52, if the capstan servo system is not in the servo lock state, phase comparing circuit 26 provides the segment error signal SE of a high level. Therefore, also in this case, switching circuit 282 is connected to the side of tracking error generating circuit 281, and a normal tracking error correcting operation is carried out.

In step 53, phase comparing circuit 26 determines whether or not the segment phase is synchronized with the frame synchronizing signal FP. More specifically, when the frame synchronizing signal FP falls, the code "c1" of the segment code signal SC, that is, reproduction of the start flag signal, is detected. In other words, in the phase relation shown in FIG. 3, it is determined whether or not the segment code signal SC is reproduced. When the phase relation shown in FIG. 3 is satisfied, that is, when the segment phases are matched, the process goes to step 54.

In step 54, the segment error signal SE of a high level is provided from phase comparing circuit 26 shown in FIG. 2. Switching circuit 282 shown in FIG. 2 is connected to the side of tracking error generating circuit 281 in response to the signal SE of a high level. Therefore, the output signal TE from tracking error generating circuit 281 is applied to capstan error generating circuit 285. In other words, since the segment phases are matched in this state, the rotation speed of capstan motor 29 is not changed for adjustment of the segment phases.

When the segment phases are not matched, the process goes to step 56. In step 56, the segment error signal SE of a low level is provided from phase comparing circuit 26 shown in FIG. 2. Switching circuit 282 is connected to the side of fixed bias circuit 283 in response to the signal SE of a low level. As a result, a predetermined fixed bias voltage is applied to capstan error generating circuit 285 from fixed voltage circuit 283 through switching circuit 282 (step 57). As a result, the rotation speed of capstan motor 29 is changed, and the phase difference between the frame synchronizing signal FP and the segment code signal SC is changed. After step 57, the process returns to step 52, and the process from steps 52 to 57 is repeated. Therefore, even if the segment phases are not matched as shown, for example, in FIG. 4, by repetition of the process of steps 52 to 57, the normal phase relation shown in FIG. 3 can be obtained.

Figure 6:
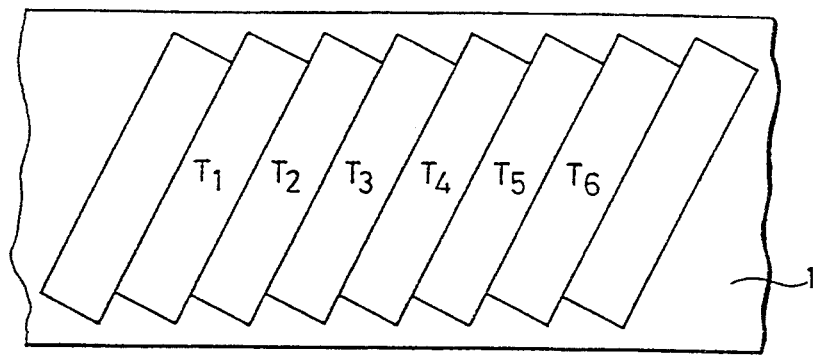
FIG. 6 is a diagram of recording track formed on a magnetic tape.

The following description will be given to the recording location on the magnetic tape of the segment code signal SC used in .the above-described embodiment. FIG. 6 shows a track formed on the magnetic tape. In the above-described embodiment, a television signal of one field is divided into six segments s1 to s6, and the six segments s1 to s6 are recorded on six tracks T1 to T6 shown in FIG. 6, respectively. In the embodiment shown in FIG. 1, that is, in a digital VTR, one recording track has a recording format shown in FIG. 7.

Figure 7:
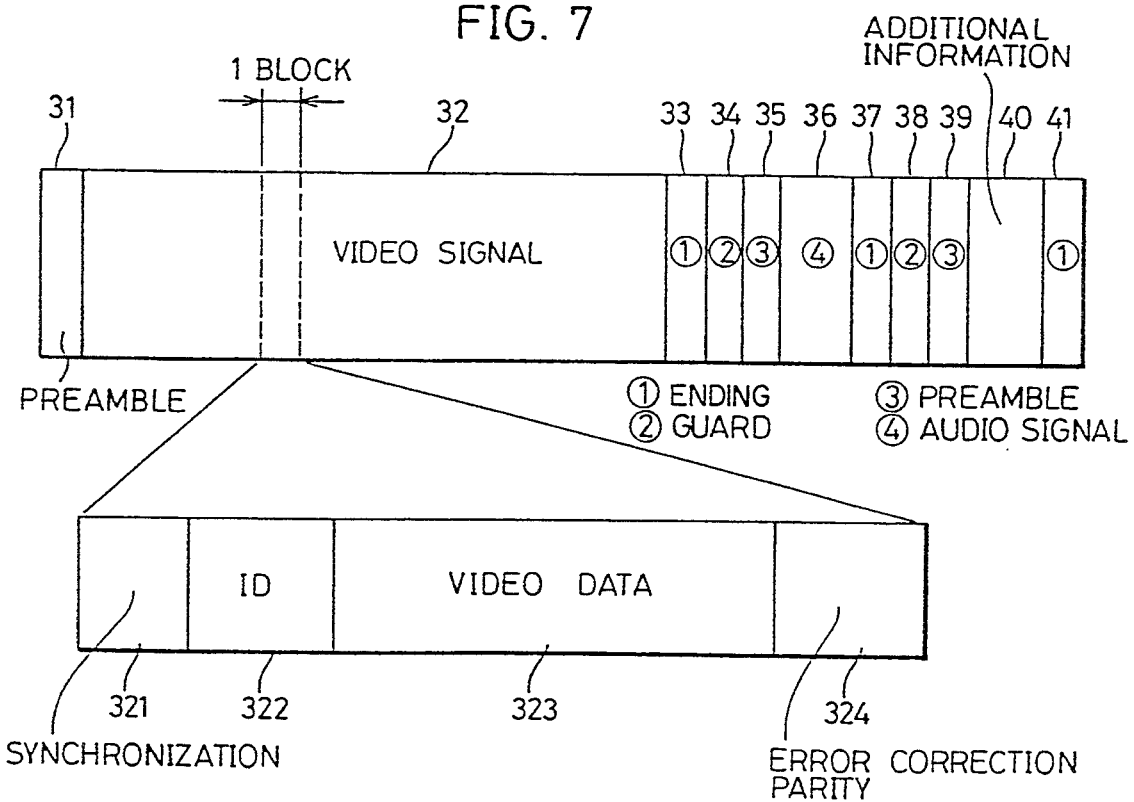
FIG. 7 is a recording format of the recording track of the first embodiment.

Referring to FIG. 7, one recording track includes preamble regions 31, 35 and 39, a video signal recording region 32, ending regions 33, 37 and 41, guard regions 34 and 38, an audio signal recording region 36, and an additional information recording region 40. Video signal recording region 32 is constituted of a number of blocks. One block in video signal recording region 32 includes a synchronizing signal recording region 321, an ID information recording region 322, a video data recording region 323, and an error correction parity recording region 324. The segment code signal SC generated from the segment code generating circuit shown in FIG. 1 is recorded in ID information recording region 322 shown in FIG. 7.

Figure 8:
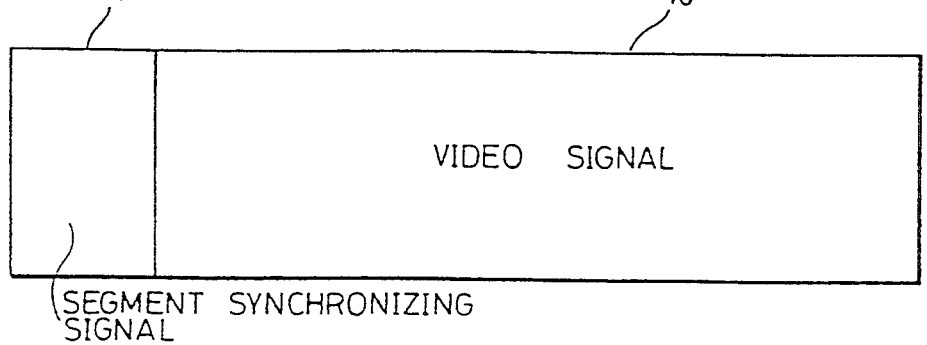
FIG. 8 is a recording format of a recording track of a second embodiment.

Although the recording format shown in FIG. 7 shows region 322 where the segment code signal SC is recorded in the digital VTR, segment code signal SC is recorded in segment synchronizing signal recording region 45 shown in FIG. 8, when the present invention is applied to an analog VTR. FIG. 8 shows a recording format of one track on a magnetic tape recorded by an analog VTR. Referring to FIG. 8, one recording track includes a segment synchronizing signal recording region 45, and a video signal recording region 46.

Figure 9:
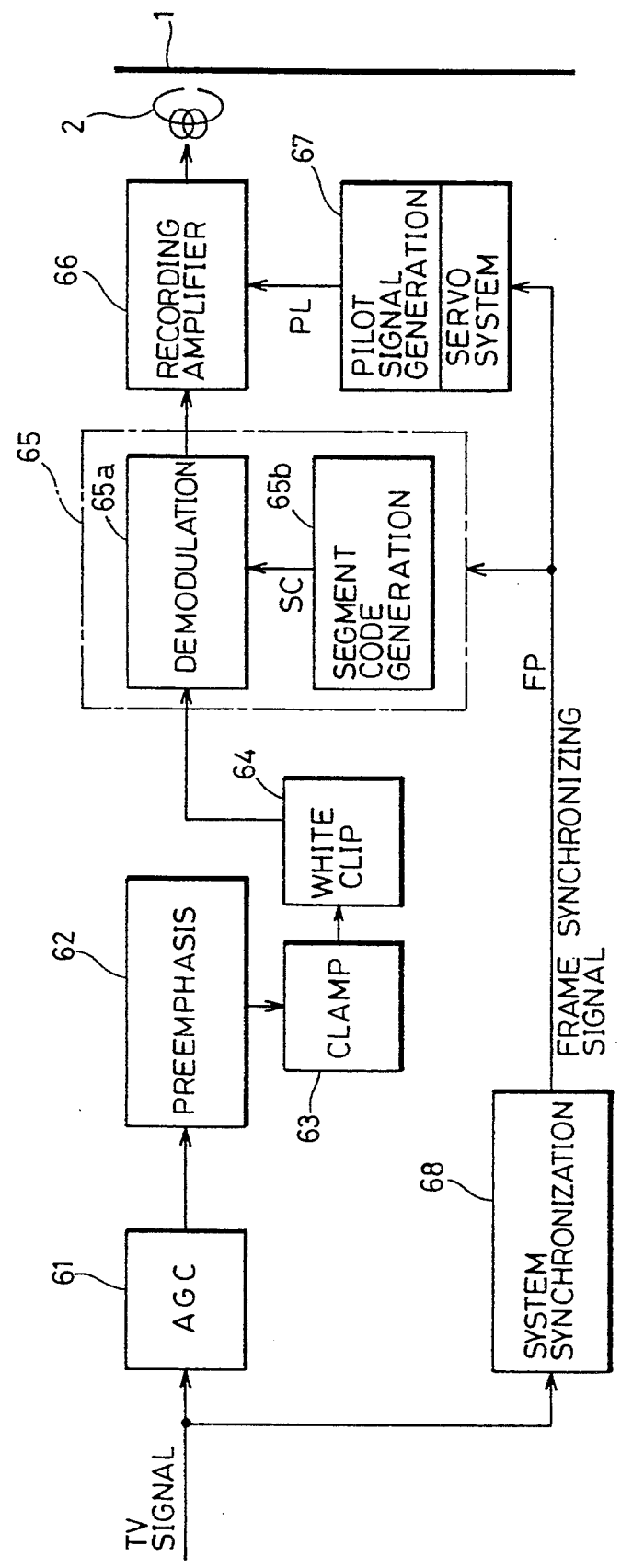
FIG. 9 is a circuit block diagram of a recording system of an analog VTR showing the second embodiment of the present invention.

FIG. 9 is a circuit block diagram of a recording system of an analog VTR showing the second embodiment of the present invention. Referring to FIG. 9, the recording system circuit includes an auto gain control (AGC) circuit 61 for receiving a television signal, a preemphasis circuit 62, a clamp circuit 63, a white clip circuit 64, a demodulating processing circuit 65 including a modulating circuit 65a and a segment code generating circuit 65b, a recording amplifier 66, a pilot signal generating circuit 67, and a system synchronizing circuit 68 for generating a frame synchronizing signal FP.

Figure 10:
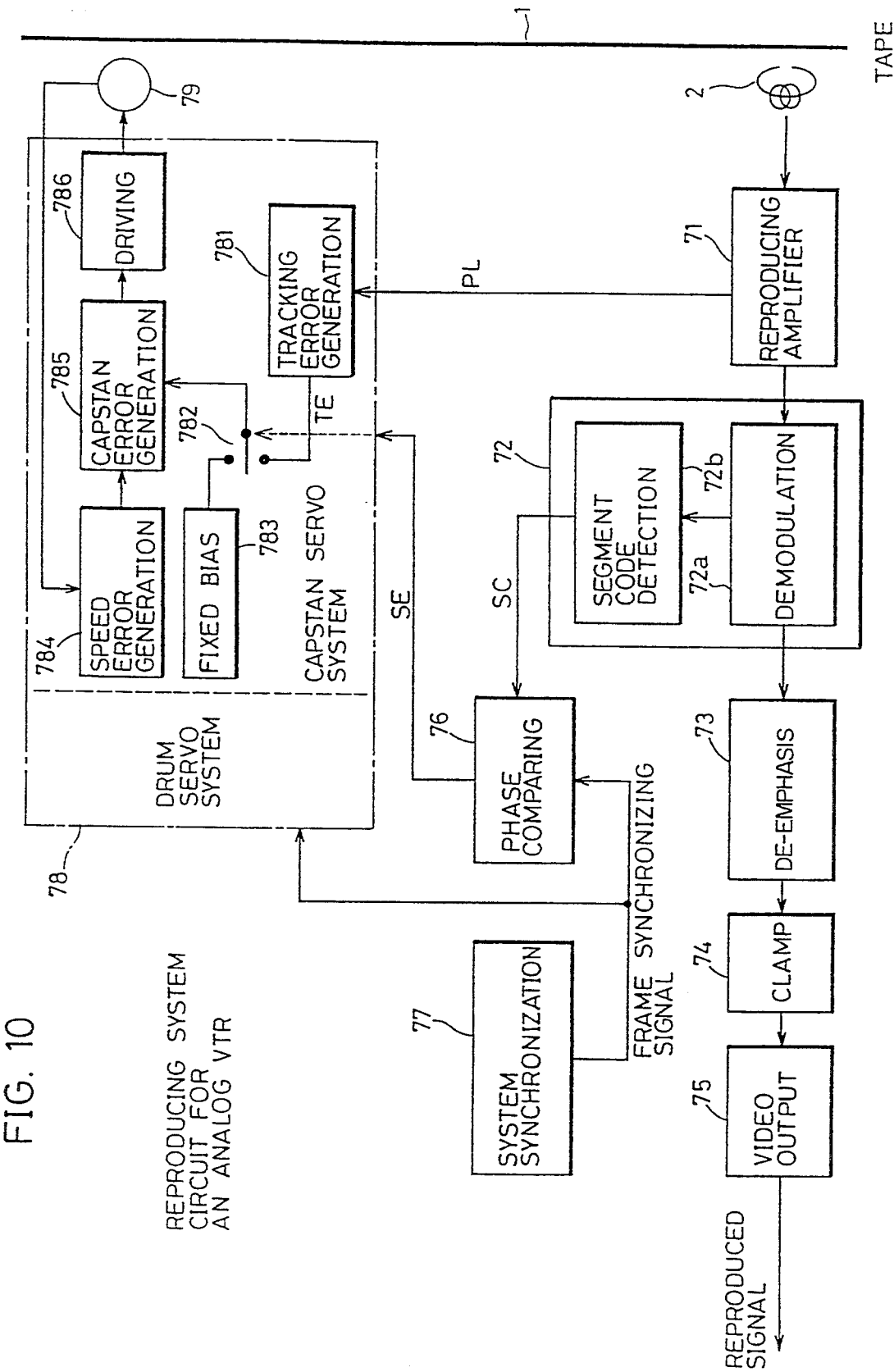
FIG. 10 is a circuit block diagram of a reproducing system in the second embodiment.

FIG. 10 is a circuit block diagram of reproducing system in the second embodiment. Referring to FIG. 10, the reproducing system circuit includes a reproducing amplifier 71, a demodulation processing circuit 72 including a demodulating circuit 72 and a segment code detecting circuit 72b, a deemphasis circuit 73, a clamp circuit 74, a video signal output circuit 75, a phase comparing circuit 76, and a servo system control circuit 78. Servo system control circuit 78 includes a drum servo system circuit and a capstan servo system circuit.

The capstan servo system circuit includes a tracking error signal generating circuit 781, a switching circuit 782, a fixed bias circuit 783, a speed error signal generating circuit 784, a capstan error signal generating circuit 785, and a motor driving circuit 786 for driving a capstan motor 79.

In the second embodiment shown in FIGS. 9 and 10, operations basically the same as those of the first embodiment shown in FIGS. 1 and 2 are carried out. More specifically, segment codes c1, c2, ..., generated in the recording mode, are recorded with divided segments s1, s2, of a television signal, respectively. The recording location of the segment code signal SC is segment synchronizing signal recording region 45 shown in FIG. 8. In the reproduction mode, segment codes c1, c2, ... recorded on each recording track on the magnetic tape are read out by segment code detecting circuit 72b shown in FIG. 10, and the rotation speed of capstan motor 79 is controlled so that a reproducing signal can be obtained in the phase relation in the recording mode, that is, in the manner shown in FIG. 3.

As described above, since the frame synchronizing signal FP is synchronized with the segment code signal SC in the reproduction mode with the same phase relation as in the recording mode by applying the present invention to a digital VTR and an analog VTR, a normal or stable video can be reproduced in the digital VTR or the analog VTR. Although the segment recording system is needed in order to implement high density recording and/or wide band recording, as described above, by applying the present invention to the digital VTR or the analog VTR, a desired video can be reproduced under requirements of high density recording and wide band recording.

Figure 11:
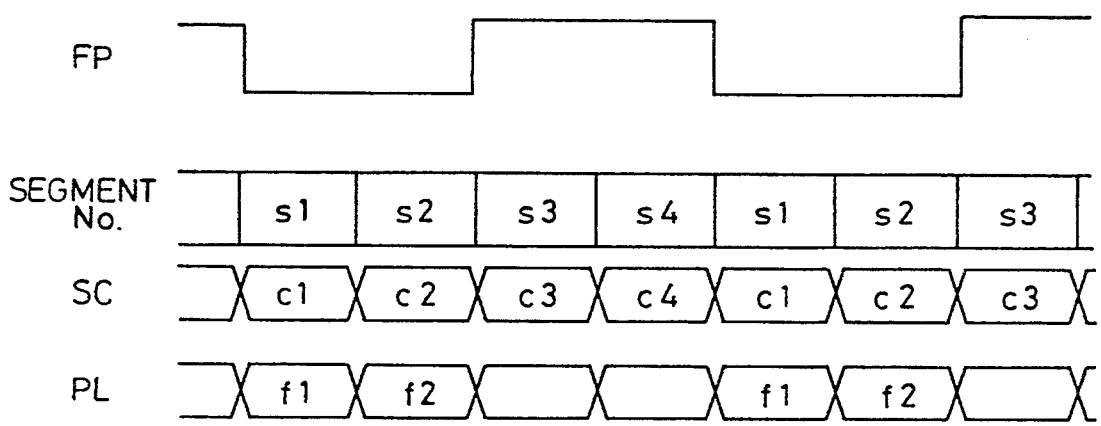
FIG. 11 is a timing chart for explaining the phase relation of a recording operation and a normal reproducing operation of a third embodiment of the present invention.
Figure 12:
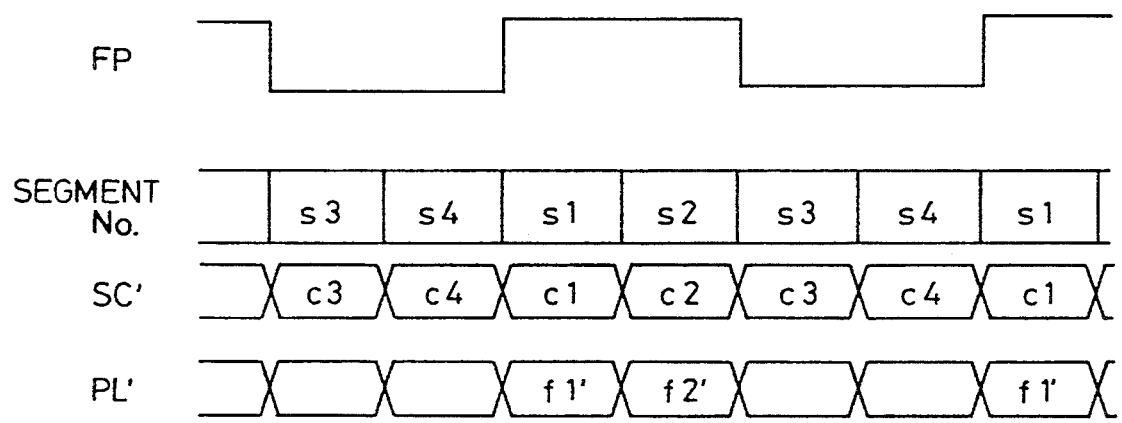
FIG. 12 is a timing chart for explaining an abnormal phase relation in the reproducing operation of the third embodiment.
Figure 13:
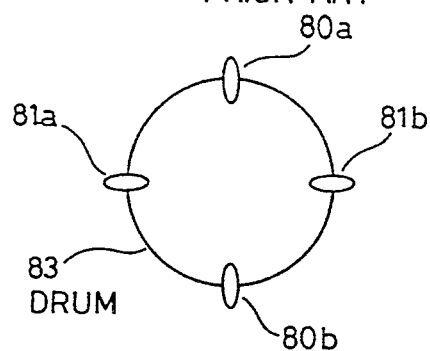
FIG. 13 is a schematic diagram showing arrangement of four magnetic heads on a drum in a conventional camcorder or a movie.
Figure 14:
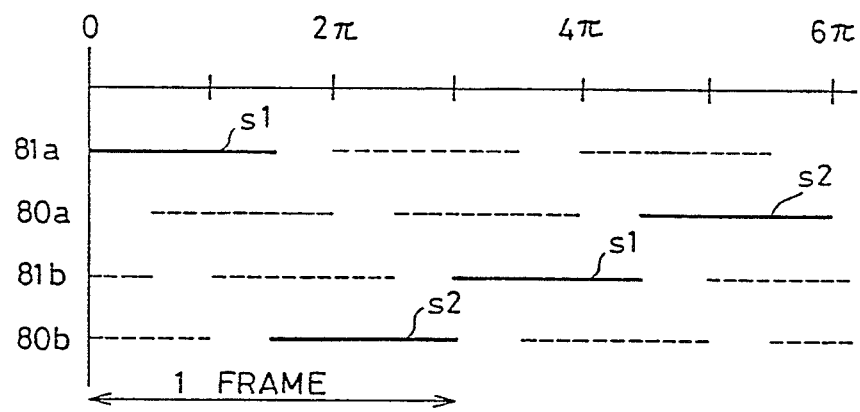
FIG. 14 is a signal recording chart for explaining a recording operation in a VTR of a four frequency pilot signal ATF system.
Figure 15:
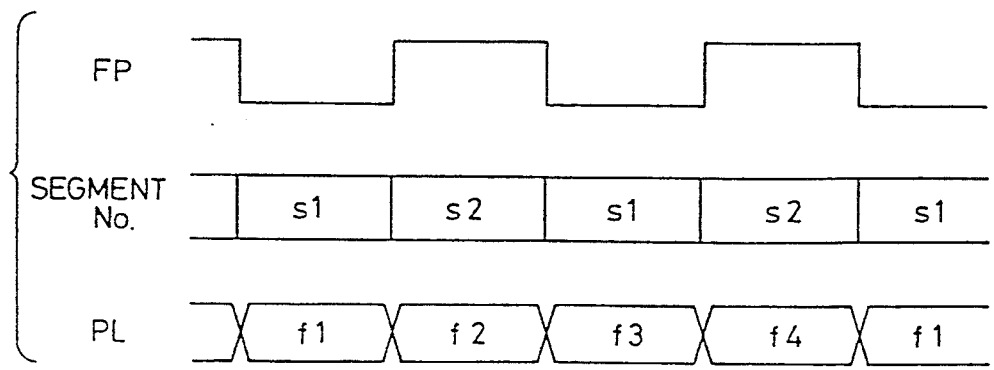
FIG. 15 is a timing chart for explaining the phase relation of the VTR of the four frequency pilot signal ATF system.

It should be noted that the ATF system using four pilot signals PL (f1 to f4) each having a different frequency is used in the above-described first and second embodiments. However, the present invention can be applied to a VTR of the ATF system using two pilot signals PL' (f1' and f2') each having a different frequency. More specifically, in the other embodiments, a segment code signal SC' and the pilot signal PL' are recorded on a magnetic tape with the phase relation shown in FIG. 11. Even if the phase relation as shown in FIG. 12 is obtained in the reproduction mode, it is possible to obtain a reproduction signal in a desired phase relation in the reproduction mode, that is, in the phase relation shown in FIG. 11, by controlling the rotation speed of the capstan motor.

Although the tracking error is detected by using the pilot signal in the above-described embodiment, the present invention can be applied to a VTR of the ATF system using an envelope detector. In that case, although tracking control is carried out so that the envelope of a reproduction signal is maximized, recording and reproduction of a segment code signal and adjustment of the segment phase are carried out in the same manner as those in the above-described embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic recording/reproducing apparatus dividing a television signal of one field into a plurality of segments and recording the plurality of segments on a plurality of tracks on a magnetic tape, comprising:
   a magnetic head;
   tape driving means for driving said magnetic tape;
   means for generating a predetermined synchronizing signal;
   means responsive to said predetermined synchronizing signal for generating a plurality of segment code signals indicating said plurality of segments;
   recording circuit means responsive to said predetermined synchronizing signal for recording the plurality of segment code signals on said plurality of tracks on said magnetic tape through said magnetic head;
   reproducing circuit means for reproducing the plurality of segment code signals from said plurality of tracks on said magnetic tape through said magnetic head; and
   control means for controlling said tape driving means so that the plurality of segment code signals reproduced by said reproducing circuit means are synchronized with said predetermined synchronizing signal;
   means for responsive to said predetermined synchronizing signal for generating a plurality of pilot signals each having a different frequency for Automatic Track Finding; and
   superimposing means for superimposing said plurality of pilot signals on said plurality of segments of said television signal for providing the plurality of superimposed signals, wherein said recording circuit means records said plurality of superimposed signals on said plurality of tracks on said magnetic tape through said magnetic head along with said plurality of segment code signals in synchronism with said predetermined synchronizing signal.

2. The magnetic recording/reproducing apparatus according to claim 1, wherein said control means includes
   phase comparing means for comparing the phase of said predetermined synchronizing signal with that of the plurality of segment code signals reproduced by said reproducing means, and tape speed changing means responsive to said phase comparing means for changing a speed of said magnetic tape driven by said tape driving means.

3. The magnetic recording/reproducing apparatus according to claim 2, wherein
said tape driving means includes a capstan motor for driving said magnetic tape, and
said tape speed changing means includes motor speed changing means responsive to said phase comparing means for changing a rotation speed of said capstan motor.

4. The magnetic recording/reproducing apparatus according to claim 3, wherein said motor speed changing means includes
means for generating a predetermined bias voltage,
motor driving circuit means for driving said capstan motor, and
bias voltage supplying means responsive to said phase comparing means for applying said predetermined bias voltage to said motor driving circuit means.

5. The magnetic recording/reproducing apparatus according to claim 1, wherein
said predetermined synchronizing signal is a frame synchronizing signal for said television signal.

6. The magnetic recording/reproducing apparatus according to claim 1, wherein
said plurality of segment code signals include a plurality of serial code signals coded in a predetermined order for every one period of said predetermined synchronizing signal.

7. The magnetic recording/reproducing apparatus according to claim 1, wherein each of said tracks on said magnetic tape includes
a segment code recording region for recording a corresponding one of said plurality of segment code signals, and
a video signal recording region for recording a video signal included in a corresponding one of said plurality of segments of said television signal.

8. The magnetic recording/reproducing apparatus according to claim 7, wherein
said segment code recording region includes a segment synchronizing signal recording region for recording a segment synchronizing signal included in said television signal, and
each of said segment code signals is recorded in a corresponding one segment synchronizing signal recording region of said plurality of tracks.

9. The magnetic recording/reproducing apparatus according to claim 1, wherein said recording circuit means includes
modulating means responsive to said plurality of segment code signals for modulating said plurality of segments of said television signal, and
recording amplifier means for amplifying a signal modulated by said modulating means, wherein
said magnetic head records a signal amplified by said recording amplifier means on said magnetic tape.

10. The magnetic recording/reproducing apparatus according to claim 9, wherein
said magnetic head reproduces a signal recorded on said magnetic tape,
said reproducing circuit means includes
reproducing amplifier means for amplifying a signal reproduced by said magnetic head, and
demodulating means for demodulating the signal amplified by said reproducing amplifier means for providing said plurality of segment code signals.

11. A magnetic recording/reproducing apparatus dividing a television signal of one field into a plurality of segments and recording the plurality of segments on a plurality of tracks on a magnetic tape, comprising:
a magnetic head
a tape driving means for driving said magnetic tape;
means for generating a predetermined synchronizing signal;
means responsive to said predetermine synchronizing signal for generating a start flag signal indicating a start of said plurality of segments;
recording circuit means for recording the start flag signal on a first one of a predetermined number of tracks on said magnetic tape in synchronism with a predetermine edge of said predetermined synchronizing signal;
reproducing circuit means for reproducing the recorded start flag signal from said plurality of tracks on said magnetic tape;
control means for controlling said tape driving means so that the start flag signal reproduced by said reproducing circuit means is synchronized with said predetermined edge of said predetermined synchronizing signal;
means responsive to said predetermined synchronizing signal for generating a plurality of pilot signals each having a different frequency for Automatic Track Finding; and
superimposing means for superimposing said plurality of pilot signals on said plurality of segments of said television signal for providing the plurality of superimposed signals, wherein said recording circuit means records said plurality of superimposed signals on said plurality of tracks on said magnetic tape through said magnetic head along with said plurality of segment code signals in synchronism with said predetermined synchronizing signal.

* * * * *